US010925266B2

(12) United States Patent
Gittings

(10) Patent No.: US 10,925,266 B2
(45) Date of Patent: Feb. 23, 2021

(54) APPARATUS FOR HARVESTING LIONFISH

(71) Applicant: Stephen R. Gittings, Dayton, MD (US)

(72) Inventor: Stephen R. Gittings, Dayton, MD (US)

(73) Assignee: UNITED STATES OF AMERICA, AS REPRESENTED BY THE SECRETARY OF COMMERCE, Silver Spring, MD (US)

( * ) Notice: Subject to any disclaimer, the term of this patent is extended or adjusted under 35 U.S.C. 154(b) by 270 days.

(21) Appl. No.: 15/946,894

(22) Filed: Apr. 6, 2018

(65) Prior Publication Data

US 2019/0021297 A1    Jan. 24, 2019

Related U.S. Application Data

(60) Provisional application No. 62/482,271, filed on Apr. 6, 2017.

(51) Int. Cl.
*A01K 69/08* (2006.01)
*A01K 74/00* (2006.01)
*A01K 69/10* (2006.01)

(52) U.S. Cl.
CPC ............ *A01K 69/08* (2013.01); *A01K 69/10* (2013.01); *A01K 74/00* (2013.01)

(58) Field of Classification Search
CPC ........ A01K 69/00; A01K 69/04; A01K 69/06; A01K 69/08; A01K 69/10; A01K 77/00; A01K 79/00; A01M 23/24; A01M 23/26; A01M 23/265
USPC ........................... 43/100, 105, 88, 90, 11, 12
See application file for complete search history.

(56) References Cited

U.S. PATENT DOCUMENTS

| 424,548 | A | * | 4/1890 | Franklin | ................ A01K 69/06 43/105 |
| 1,420,396 | A | * | 6/1922 | Warren, Sr. | ............ A01K 73/12 43/12 |
| 2,520,780 | A | * | 8/1950 | Pieron | ..................... A01K 77/00 43/105 |
| 2,911,755 | A | * | 11/1959 | Rabin | ..................... A01K 73/12 43/105 |

(Continued)

FOREIGN PATENT DOCUMENTS

GB        2150801 A  *  7/1985  ............. A01K 69/06

OTHER PUBLICATIONS

Ianweber75, The Clam Trap, Dec. 15, 2011, YouTube.

(Continued)

*Primary Examiner* — Darren W Ark
*Assistant Examiner* — Kevin M Dennis

(57) ABSTRACT

Embodiments of the present invention relate to an apparatus for capturing lionfish near the ocean floor. The present invention uses two jaws connected at the center by an axle such that the jaws open outward on contact with the seabed to form a ring supporting a loose netting. Embodiments of the present invention further include a deflector located on each jaw that facilitates opening of the jaws when the lionfish capture device contacts the ocean floor. A fish attraction device, or devices, located at substantially the center of the lionfish capture device is capable of attracting lionfish to an area defined by the ring formed by the jaws. Hauling of the capture device causes the jaws to close around and secure the fish that are within its perimeter.

11 Claims, 8 Drawing Sheets

(56) References Cited

U.S. PATENT DOCUMENTS

| | | | | |
|---|---|---|---|---|
| 3,939,597 | A | * | 2/1976 | McSherry ............... A01K 69/06 43/105 |
| 4,050,182 | A | * | 9/1977 | Basile .................... A01K 69/06 43/105 |
| 4,141,172 | A | * | 2/1979 | Prosol ................... A01K 69/06 43/105 |
| 4,177,600 | A | * | 12/1979 | Torkko .................. A01M 23/26 43/82 |
| 4,406,083 | A | * | 9/1983 | Hart ...................... A01K 69/06 43/105 |
| D303,135 | S | * | 8/1989 | Simonson .................... D22/121 |
| 5,287,647 | A | * | 2/1994 | Longo ................... A01K 69/06 43/100 |
| D348,095 | S | * | 6/1994 | Simonson .................... D22/121 |
| 5,842,304 | A | * | 12/1998 | Rivera ................... A01K 69/06 43/105 |
| 2006/0156610 | A1 | * | 7/2006 | Norman .................. A01K 97/20 43/11 |
| 2018/0228134 | A1 | * | 8/2018 | Dominguez ........... A01K 69/02 |

OTHER PUBLICATIONS

Henry Q, Prepare Half Moon Clamshell Crab Trap for Salt Water Crabbing, Sep. 25, 2015, YouTube.
Monofilament Cast Nets, Memphis Net & Twine, Jan. 13, 2016.
Crab Net, 2-Ring, Memphis Net & Twine, Mar. 24, 2016.
Live Cars, Memphis Net & Twine, Mar. 24, 2016.
Crawfish Net, Memphis Net & Twine, Mar. 24, 2016.
Live Nets, Memphis Net & Twine, Mar. 24, 2016.
Complete Umbrella Net with Frame and 3/16 in. mesh Polyethylene Net, Memphis Net & Twine, Mar. 31, 2016.
Reef Fish Surveys, NOAA Southeast Fisheries Science Center, Oct. 8, 2014.

* cited by examiner

SKELETON VIEW OF JAWS

SIDE VIEW OF JAW

APPARATUS FOR HARVESTING LIONFISH

CROSS-REFERENCE TO RELATED APPLICATION

This application claims the benefit of priority from U.S. Provisional Patent Application Ser. No. 62/482,271, which was filed on Apr. 6, 2017 and entitled "FAD-Based Non-Containment Curtain Trap for Lionfish," the disclosure of which is incorporated herein by reference for all purposes.

STATEMENT REGARDING FEDERAL RIGHTS

The invention described herein was made with support from the National Oceanic and Atmospheric Administration (NOAA) of the United States Department of Commerce. The United States Government has certain rights in the invention.

FIELD OF THE INVENTION

The present disclosure relates generally to fish harvesting, and more specifically, to an apparatus for selectively capturing invasive species of fish.

BACKGROUND OF THE INVENTION

The range and abundance of two invasive lionfish species (*Pterois volitans* and *P. miles*), native to the Pacific and Indian Ocean, continue to increase in the north Atlantic basin and eradication in the invaded range is not considered possible. Evidence from shallow reefs (<30 m) suggests impacts of the invasion on native ecosystems. Studies have shown region-wide impacts of lionfish on the continental shelf of the eastern United States. For example, studies have shown, between 15 and 100 meters, Tomtate (*Haemulon aurolineatum*), a native forage species, declined in abundance by 45% from 1990 to 2014, coincident with the rapid population increase of lionfish.

As awareness, interest and concern over the lionfish invasion have grown, there have been efforts to respond. Adding to the call for increased capacity for removal of lionfish is a growing demand for lionfish in the seafood market. Most removals have been by spearfishing; lionfish derbies are regularly held to remove lionfish, but are limited to scuba depths and less effort has been focused on deep water. Though lionfish are also occasionally harvested by hook-and-line fishing at various depths, harvest from deep water has been primarily as bycatch (that is, non-targeted species) in lobster traps and weir traps. However, existing traps do not capture lionfish in numbers large enough to offer potential in exerting control over deep water populations. This could be partly because lionfish, which prey on live fish and invertebrates, are not attracted to the baits commonly used in existing traps. Studies have shown that they are attracted to the structure of the trap itself. Thus, over most of their invaded range, lionfish populations in depths beyond 30 meters are largely uncontrolled.

There is a need for solutions that target lionfish in deeper water but leave other species unharmed. Proposed solutions include modifications to existing lobster traps, traps that open only upon electronic identification of a lionfish, hydraulically powered spears, electrocution devices, and modified suction samplers. While specialized traps could play a role, they will need to be designed to avoid both bycatch and ghost fishing (continued fish capture after being disconnected from surface marker) before being accepted and permitted as suitable for lionfish control. Accordingly, there is a need for trap designs that exclusively target and capture lionfish. There is also a need for lionfish entrapment device that provides an increased lionfish capture success rate while reducing bycatch and reducing other impact on the environment.

SUMMARY OF THE INVENTION

Embodiments of the present invention relate to methods and apparatus for capturing lionfish while reducing bycatch and reducing impact on the environment. At least one design feature of the present invention includes a structural fish attraction device (FAD), which exploits the attraction of lionfish to structure in deep water. Attraction of these species to vertical relief is disproportionately high compared to other species, and their docile nature and high site fidelity facilitate their capture using the apparatus described herein. Embodiments of the present invention described herein are "non-containment," in that they are open and do not entrap fish until the trap is retrieved. The non-containment design feature in accordance with embodiments of the present invention allows for capture of lionfish without the use of bait, and the lack of bait reduces the attraction and/or entrapment of potential bycatch. Another design feature of the present invention provides an enclosable "curtain trap" design, in which a curtain of netting is pulled up around the FAD upon retrieval. The curtain trap design feature in accordance with embodiments of the present invention prevents movement and disturbance around lionfish trapped in the netting, thereby reducing attempts by lionfish to escape the trap.

Accordingly, embodiments of the present invention relate to an apparatus for capturing lionfish, including a first jaw comprising a first frame member, wherein first distal end of the first frame member comprises a first elbow connector, wherein the first elbow connector is located along an axis traversing the center of the first frame member; a second jaw comprising a second frame member, wherein first distal end of the second frame member comprises a second elbow connector, wherein the second elbow connector is located along the axis traversing the center of the second frame member; an axle having first and second distal end, wherein the length of the axle is selected to extend the first and second distal ends outside an area defined by the first and second jaws; a first hinge plate located at second distal end of the first frame member, wherein the first hinge plate comprises first and second hinge plate openings, wherein the first hinge plate opening is capable of receiving the first elbow connector, wherein the second hinge plate opening is capable of receiving first distal end of the axle; a second hinge plate located at second distal end of the second frame member, wherein the second hinge plate comprises third and fourth hinge plate openings, wherein the third hinge plate opening is capable of receiving the second elbow connector, wherein the fourth hinge plate opening is capable of receiving second distal end of the axle; a first deflector extending from second distal end of the first frame member, wherein the first deflector is capable of rotating the first jaw upon contact with a surface; a second deflector extending from second distal end of the second frame member, wherein the second deflector is located diametrically opposite to the first deflector upon connecting the first elbow connector to the first hinge plate and the second elbow connector to the second hinge plate, wherein the second deflector is capable of rotating the second jaw upon contact with the surface; a fish attraction device for attracting lionfish to a location within the area defined by the first and second jaws; a netting secured to the first and second jaw, wherein the netting is capable of securing a plurality of captured lionfish upon closing the first and second jaws, wherein the netting is capable of billowing upon closing the first and second jaws; a harness comprising first and second harness lines for opening and closing the first and second jaws, wherein first ends of the first and second harness lines are connected to a float, wherein second ends of the first and second harness lines traverse a harness loop in opposite directions to separate into the first harness line and the second harness line, wherein the second end of the first harness line is connected to the apex of the second frame member, and wherein the second end of the second harness line is connected to the apex of the first frame member; and a lift line connected to the float for hauling the lionfish capturing system into and from ocean water.

More particularly, the first and second elbow connectors further comprises first and second openings for receiving first and second cotter pins, wherein the first and second cotter pins secure the first and second elbow connectors to the first and second hinge plates.

In one aspect of the present invention, the first and second frame members are semi-circular. More particularly, the diameter of the circular ring formed by the first and second frame members is about 2 meters. In some aspects of the present invention, the first and second frame members are semi-octagonal.

In another aspect of the present invention, the first hinge plate opening receiving the first elbow connector and the third hinge plate opening receiving the second elbow connector connect the first and second frame members to form a circular ring. More particularly, the first hinge plate opening receiving the first elbow connector and the third hinge plate opening receiving the second elbow connector connect the first and second frame members to form an octagonal ring.

In some embodiments of the present invention, the first and second deflectors are bent to form curved skids, wherein the curved skids are bent along an arc with distal ends of the curved skids perpendicular to the plane of the first and second jaws. More particularly, the distal ends of the curved skids extend from the plane of the first and second jaws by about 46 centimeters.

In other embodiments of the present invention, the first and second distal ends of the axle further comprises first and second openings, wherein the first and second openings receive cotter pins to secure the axle with the first and second hinge plates.

In one embodiment of the present invention, the length of the axle is selected to position the first and second openings outside the first and second hinge plates and the area defined by the first and second jaws. More particularly, the length of the axle is about 2.15 meters.

In one aspect of the present invention, the fish attraction device comprises a fish attraction panel and a plurality of fish attraction floats, wherein the fish attraction panel and the plurality of fish attraction floats form a three-dimensional vertical structure capable of attracting lionfish. In one embodiment of the present invention, the fish attraction panel is a flat rectangular panel comprising a patterned lattice, wherein the fish attraction panel is positioned vertically at the center of the area defined by the first and second jaws. In another embodiment of the present invention, each of the plurality of the fish attraction floats is a cylindrical tubing capped at both ends, and wherein the cylindrical tubing is filled with air to provide buoyancy.

Embodiments of the apparatus in accordance with the present invention further includes a center support located vertically at the center of the area defined by the first and second jaws, wherein the center support is a cylindrical tubing, wherein top end of the center support comprises a notch capable of receiving and securing the harness loop, wherein bottom end of the center support is secured to the axle, and wherein the center support is capable of supporting the fish attraction panel in the vertical position when secured to the axle.

Another embodiment of the present invention relates to an apparatus for capturing lionfish, including a first jaw comprising a first semi-circular ring member, wherein the distal ends of the first semi-circular ring member comprises a first and second openings, wherein the first and second openings face each other along an axis traversing the center of the first semi-circular ring member, wherein the first semi-circular ring member further comprises a first lift ring located substantially at a central portion along the circumference of the first semi-circular ring member; a second jaw comprising a second semi-circular ring member, wherein the distal ends of the second semi-circular ring member comprises a third and fourth openings, wherein the third and fourth openings face each other along the axis traversing the center of the second semi-circular ring member, wherein the second semi-circular ring member further comprises a second lift ring located substantially at a central portion along the circumference of the second semi-circular ring member; an axle positioned along the axis of the traversing the centers of the first and second semi-circular ring members, wherein the first, second, third and fourth openings of the first and second jaws are capable of receiving distal ends of the axle to form a circular ring comprising the first and the second semi-circular ring members; a first deflector extending from one of the distal ends of the first semi-circular ring member, wherein the first deflector is capable of rotating the first jaw upon contact with a surface; a second deflector extending from one of the distal ends of the second semi-circular ring member, wherein the second deflector is located diametrically opposite to the first deflector, and wherein the second deflector is capable of rotating the second jaw upon contact with the surface; a netting supported by the first and second jaw, wherein the netting is capable of loosely securing a plurality of captured lionfish; a fish attraction device for attracting lionfish to a location within the area defined by the first and second semi-circular ring members of the first and second jaws, wherein the fish attraction device comprises a closed loop located on top edge; and a harness connected to the first and second jaws for hauling the lionfish capturing system into and from ocean water, wherein the harness traverses through a float and the closed loop to separate into a first harness line and second harness line, wherein the first harness line is connected to the first lift ring and the second harness line is connected to the second lift ring. In one embodiment of the present invention, the first and second jaw further comprises a first lifting hook and a second lifting hook. In another embodiment of the present invention, the axle further comprises a base, wherein the center of the base is aligned with the midpoint of the axle.

Embodiments of the apparatus in accordance with the present invention further includes a first spoke extending from apex of the first semi-circular ring member to the axle, wherein the first spoke forms a first closed loop around the axle; and a second spoke extending from apex of the second semi-circular ring member to axle, wherein the second spoke forms a second closed loop around the axle.

DETAILED DESCRIPTION

Embodiments of the present invention relate to methods and apparatus for capturing lionfish while reducing bycatch and other impact on the environment. At least one design feature of the present invention includes a structural fish attraction device (FAD), which exploits the attraction of lionfish to structure in deep water. Embodiments of the present invention described herein also provides a non-containment design feature that allows the trap to remain open and does not entrap fish until the trap is retrieved. The non-containment design feature in accordance with embodiments of the present invention allows for capture of lionfish without the use of bait, and the lack of bait reduces the attraction and/or entrapment of potential bycatch. Another design feature of the present invention provides an enclosable "curtain trap" design, in which a curtain of netting is pulled up around the FAD upon retrieval. The curtain trap design feature in accordance with embodiments of the present invention prevents movement and disturbance around lionfish trapped in the netting, thereby reducing attempts by lionfish to escape the trap.

Figure 1:
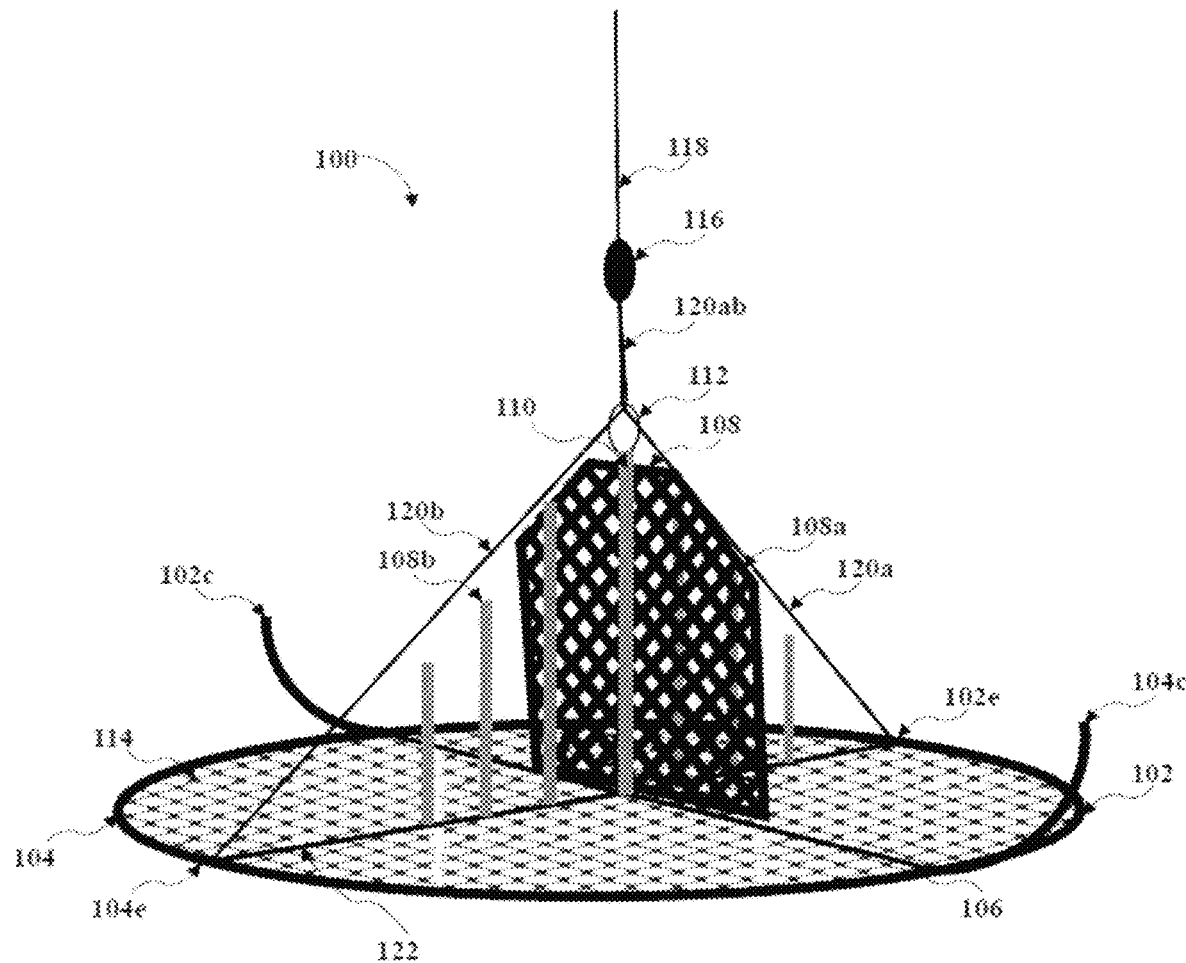
FIG. 1 illustrates a lionfish harvesting apparatus in accordance with an embodiment of the present invention.
Figure 2:
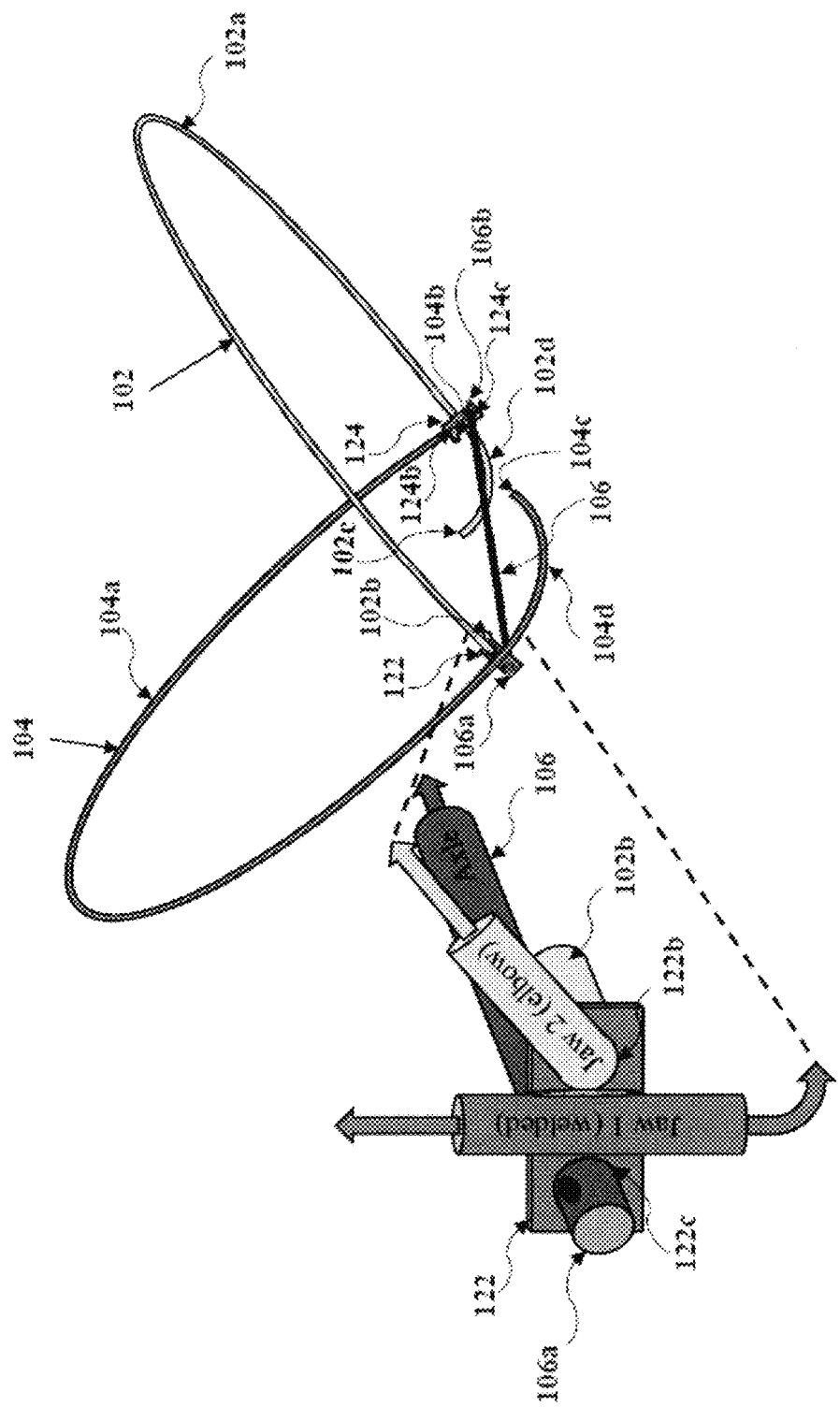
FIG. 2 illustrates an alternate view of lionfish harvesting apparatus frame and hinge assembly in accordance with an embodiment of the present invention.

Referring now to the drawings, and more particularly, to FIGS. 1 and 2, there is shown a lionfish harvesting apparatus for capturing lionfish while reducing by-catch, generally designated 100, which comprises embodiments of the present invention. Lionfish harvesting system 100 includes jaws 102 and 104, axle 106, fish attraction device (FAD) 108, center support 110, harness loop 112, netting 114, float 116, lift line 118, and two-line harness 120ab.

Figure 4:
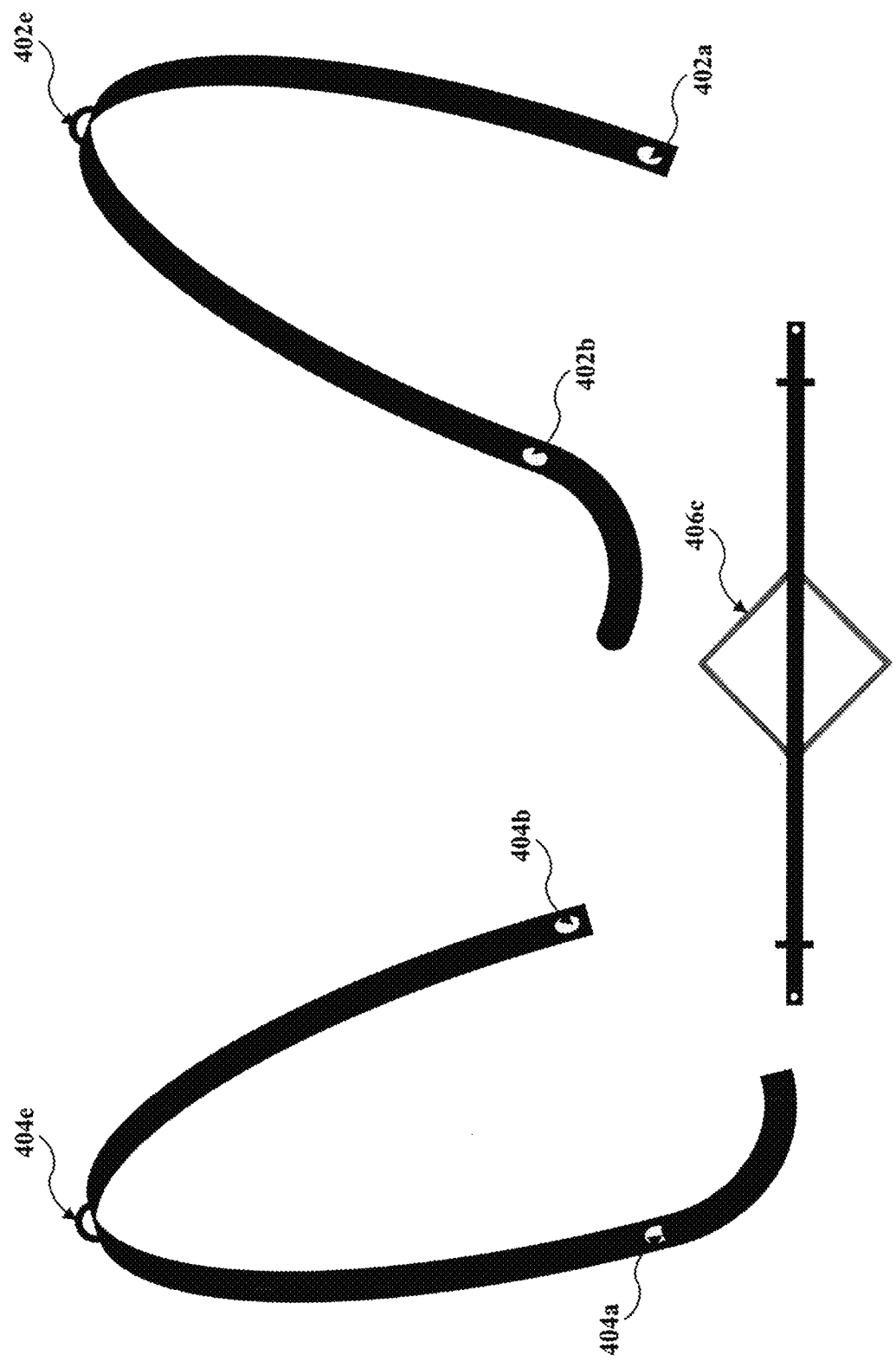
FIG. 4 illustrates an alternate embodiment of lionfish harvesting system in accordance with an embodiment of the present invention.

Jaw 102 is formed by a frame member 102a with one end of frame member 102a bent to form elbow connector 102b, as shown in FIG. 2. Elbow connector 102b is located along an axis traversing the center of frame member 102a. In one embodiment of the present invention, one end of frame member 102a is bent at a predetermined location by about 90 degrees to form elbow connector 102b having a length of about 10 centimeters. Elbow connector 102b further includes an opening at its end capable of receiving a cotter pin to prevent sliding or slipping when secured to hinge plate 122. In an alternate embodiment of the present invention, jaw 102 includes opening 402a positioned on one end of frame member 102a and opening 402b positioned on the other end of frame member 102a such that openings 402a and 402b face each other along an axis traversing the center of the frame member 102a, as shown in FIG. 4.

Figure 3A:
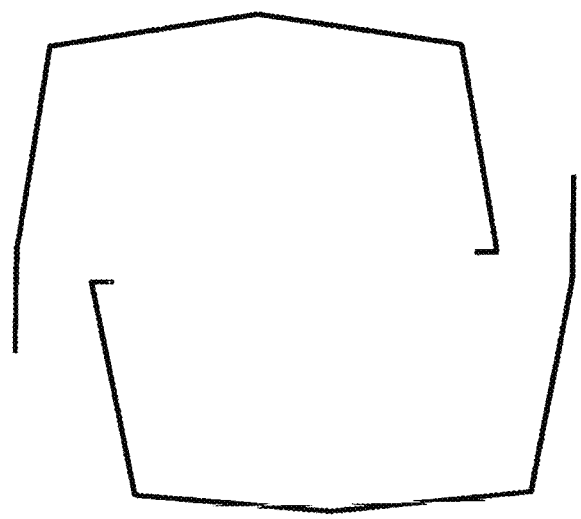
FIGS. 3A and 3B illustrate the skeleton view and side view of an alternate embodiment of frame and hinge assembly in accordance with an embodiment of the present invention.
Figure 3B:
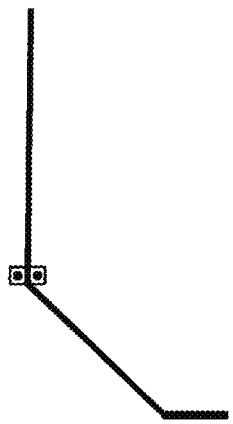

Jaw 104 is formed by frame member 104a substantially similar to frame member 102a of the jaw 102 with one end of frame member 104a bent to form elbow connector 104b, as shown in FIG. 2. Elbow connector 104b is located along an axis traversing the center of frame member 104a. In one embodiment of the present invention, one end of frame member 104a is bent at a predetermined location by about 90 degrees to form elbow connector 104b having a length of about 10 centimeters. In some embodiments of the present invention, frame members 102a and 104a are semi-circular ring members having a diameter of about 2 meters. In other embodiments of the present invention, frame members 102a and 104a are semi-octagonal members having a length of about 2 meters between two opposite vertices, as shown in FIGS. 3A and 3B. In exemplary embodiments of the present invention, frame members 102a and 104a are formed from a rebar having diameter of about 1.59 centimeters. Elbow connector 104b further includes an opening at each end capable of receiving a cotter pin to prevent sliding or slipping when secured to hinge plate 124. In an exemplary embodiment of the present invention, openings at the ends of elbow connectors 102b and 104b have a diameter of about 5 millimeters. In an alternate embodiment of the present invention, jaw 104 includes openings 404a and 404b positioned on each end of jaw 104 such that openings 404a and 404b face each other along an axis traversing the center of the frame member 104a, as shown in FIG. 4. Further, openings 402a, 402b, 404a and 404b are positioned to receive distal ends 106a and 106b of axle 106. Dimensions of openings 402a, 402b, 404a and 404b are selected to accommodate the ends of axle 106. In an exemplary embodiment of the present invention, openings 402a, 402b, 404a and 404b have a diameter of about 1.8 centimeters and are capable of accommodating axle 106 formed from a rebar having a diameter of about 1.59 centimeters. In one embodiment of the present invention, jaws 102 and 104 have a radius of about 1 meter. In some embodiments of the present invention, jaws 102 and 104 are formed from metal rod having a diameter of about 1.59 centimeters. In other embodiments of the present invention jaws 102 and 104 are formed from flat metal bar having a width of about 2.54 centimeters.

Jaw 102 further includes a deflector 102c formed at second end of frame member 102a attached to hinge plate 124, as shown in FIG. 2. Jaw 104 further includes a deflector 104c substantially similar to deflector 102c and formed at second end of the frame member 104a attached to hinge plate 122. In one embodiment of the present invention, deflectors 102c and 104c are formed by extending one end of frame members 102a and 104a, respectively, and bending the extensions along an arc in a direction substantially perpendicular to the plane of frame members 102a and 104a to form curved skids 102d and 104d, as shown in FIG. 2. In an exemplary embodiment of the present invention, deflectors 102c and 104c are formed by extending one end of frame members 102a and 104a, respectively, and bending the extensions along an arc ending by about 90 degrees from the plane of frame members 102a and 104a to form curved skids 102*d* and 104*d* extending by about 46 centimeters from the plane of jaws 102 and 104. When jaws 102 and 104 are connected to form a circular ring, deflectors 102*c* and 104*c* are located diametrically opposite to each other and extend in a direction substantially perpendicular to the plane of frame members 102*a* and 104*a* and in a direction opposite to each other, as further shown in FIGS. 2 and 3.

Referring to FIG. 2, lionfish harvesting apparatus 100 further includes hinge plate 124 attached to jaw 102 and hinge plate 122 attached to jaw 104. In one embodiment of the present invention, hinge plates 122 and 124 have a length of about 10 centimeters and a width of about 3.8 centimeters. Frame member 102*a* of jaw 102 is attached to hinge plate 124 at a location between hinge plate openings 124*b* and 124*c* (not shown) such that the plane of hinge plate 122 is perpendicular to the axis traversing the center of frame member 102*a* and such that the longitudinal axis of hinge plate 122 is perpendicular to frame member 102*a*. Frame member 104*a* of jaw 104 is attached to hinge plate 122 at a location between hinge plate openings 122*b* and 122*c* such that the plane of hinge plate 124 is perpendicular to the axis traversing the center of frame member 104*a* and the longitudinal axis of hinge plate 124 is perpendicular to frame member 104*a*. Dimensions of hinge plate openings 122*b* and 124*b* are selected to loosely accommodate elbow connectors 102*b* and 104*b*, and dimensions of hinge plate openings 122*c* and 124*c* are selected to loosely accommodate axle ends 106*a* and 106*b*. In one embodiment of the present invention, each of hinge plate openings 122*b*, 122*c*, 124*b* and 124*c* have a diameter of about 1.8 centimeters. Hinge plate openings 122*b* and 124*b* are positioned on hinge plates 122 and 124 to receive elbow connectors 102*b* and 104*b* to connect frame members 102*a* and 104*a* to hinge plates 122 and 124 to form a circular ring.

In an alternate embodiment of the present invention, as shown in FIG. 4, at substantially the central portion along the circumference of frame members of each of jaws 102 and 104 is pivotally mounted lift rings 402*e* and 404*e*. Each of lift rings 402*e* and 404*e* is formed from a material substantially similar to that used for the frame members of jaws 102 and 104, and is bent at one end into a closed loop engaging the respective frame member, as shown in FIG. 4. In one embodiment of the present invention, each of lift rings 402*e* and 404*e* is bent at one end into a closed loop and further extending to form straight members angled outward from the planes of jaws 102 and 104 before engaging the respective frame member. In one embodiment of the present invention, the closed loop of each of lift rings 402*e* and 404*e* have a diameter of about 2.54 centimeters.

Figure 5:
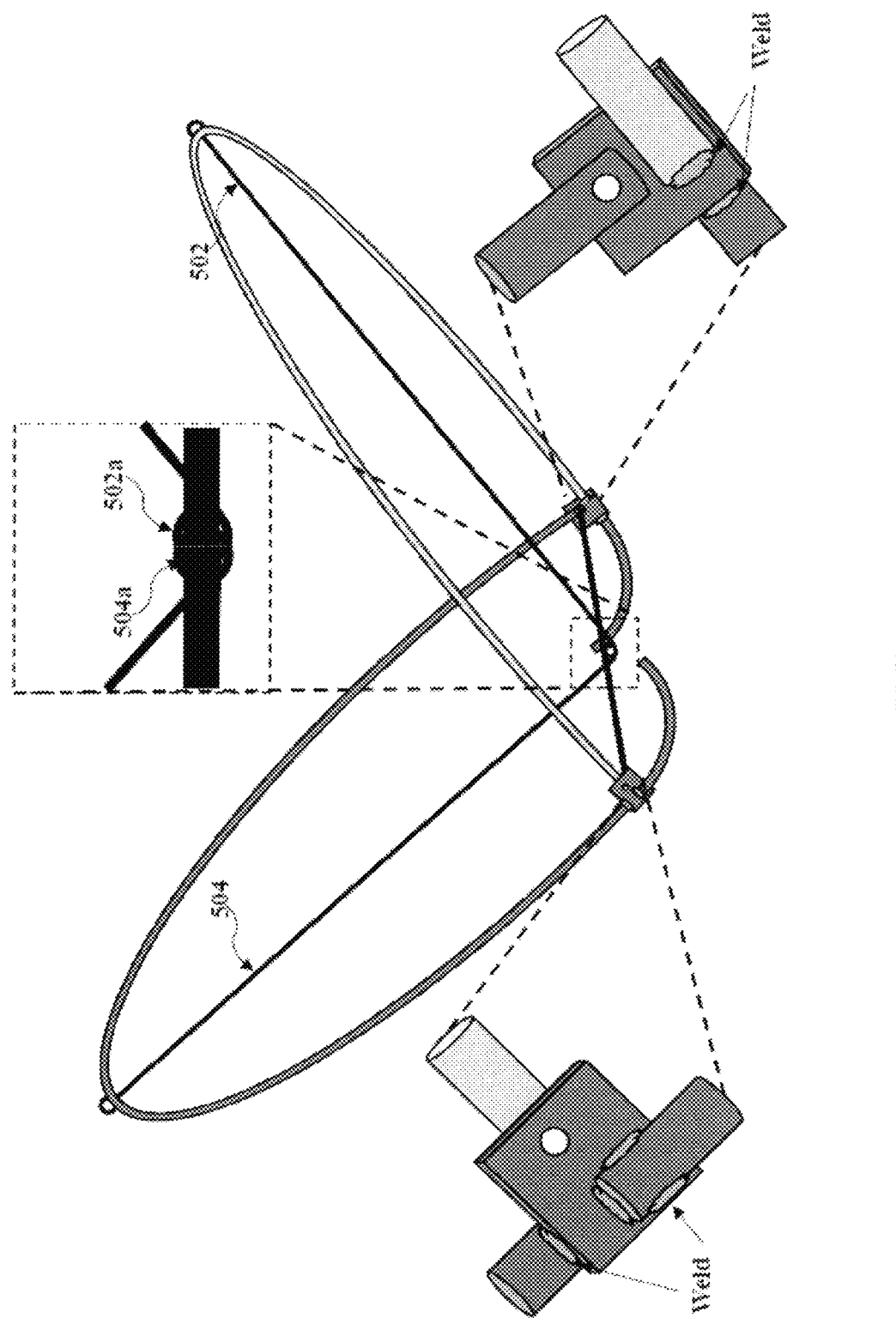
FIG. 5 illustrates an exemplary assembly for spokes and lift rings in accordance with an alternate embodiment of the present invention.

In other embodiments of the present invention, jaw 102 further includes spoke 502 and jaw 104 further includes spoke 504, as shown in FIG. 5, located at substantially the central portion of frame members of each jaws 102 and 104. Spokes 502 and 504 extend from substantially the apex of frame members of each jaws 102 and 104 and are bent at one end into closed loops 502*a* and 504*a*. Closed loops 502*a* and 504*a* are positioned along an axis traversing the center of the frame member such that closed loops 502*a* and 504*a* are capable of receiving axle 106.

Referring again to FIG. 2, axle 106 is positioned along the axis traversing through openings 124*c* and 122*c*, and through the center of jaws 102 and 104, such that the ends 106*a* and 106*b* of axle 106 are capable of being inserted into openings 124*c* and 122*c* to connect jaws 102 and 104 to form a circular ring when jaws 102 and 104 are hinged or opened outward. Axle 106 further includes an opening at each end capable of receiving a cotter pin to prevent sliding or slipping when secured to hinge plates 122 and 124, as shown in FIG. 2. In an exemplary embodiment of the present invention, the openings at each end of axle 106 have a diameter of about 5 millimeters. Length of axle 106 is selected such that each end of axle 106 extends beyond hinge plates 122 and 124 to position the openings for cotter pins outside hinge plates 122 and 124 and the area defined by jaws 102 and 104. In one embodiment of the present invention, axle 106 has a length of about 2.15 meters. Axle 106 may be made from materials including steel bar, steel pipe, and the like. In some embodiments of the present invention, axle 106 further includes a base 406*c* positioned at a central location along the longitudinal axis of axle 106, as shown in FIG. 4. Base 406*c* provides stability to lionfish harvesting system 100, by preventing axle 106 from rotating along its longitudinal axis when lionfish harvesting system 100 is placed in open position at the bottom of the ocean floor. In one embodiment of the present invention, base 406*c* has a square shape with each side have a dimension of about 0.3 meters. In another embodiment of the present invention, base 406*c* has a circular shape (not shown) having a diameter of about 0.3 meters.

Jaws 102 and 104 support the mouth of a flexible netting 114, which may be of any suitable material but, conventionally, is nylon or polyethylene. In one embodiment of the present invention, the length of netting attached to jaws 102 and 104 is about 170% of the diameter of jaws 102 and 104 when in the open position. Netting 114 may be secured to jaws 102 and 104 by any number of conventional means. In some embodiments of the present invention, netting 114 is secured to jaws 102 and 104 by twine wrapped through netting 114 and around frame members 102*a* and 104*a*. In the illustrated embodiment shown in FIG. 1, netting 114 is of nylon loosely secured to frame members 102*a* and 104*a* with twine wrapped through netting 114 and around frame members 102*a* and 104*a*. It will now be apparent from FIG. 1 that the jaws 102 and 104, when hinged outwardly, will maintain netting 114 in an open position. In one embodiment of the present invention, netting 114 is about ⅞-inch knotless nylon netting.

Referring now to FIG. 1, there is shown a fish attraction device (FAD) 108 in accordance with an embodiment of lionfish harvesting system 100 capable of attracting lionfish to a location within an area defined by the frame members of jaws 102 and 104. FAD 108 includes a fish attraction panel 108*a* and fish attraction floats 108*b* arranged to form a three-dimensional vertical structure capable of attracting lionfish. In one embodiment of the present invention, fish attraction panel 108*a* is a flat rectangular panel having a patterned lattice with corners trimmed such that fish attraction panel 108*a* fits within jaws 102 and 104 when lionfish harvesting apparatus 100 is closed. Exemplary materials that can be used for fish attraction panel 108*a* include plastic, wood, or other buoyant materials. Fish attraction panel 108*a* is positioned vertically at the center of area defined by jaws 102 and 104 with bottom edge of fish attraction panel 108*a* aligned along axle 106. Fish attraction panel 108*a* is supported vertically at the center of area defined by jaws 102 and 104 with center support 110. Fish attraction panel 108*a* is secured, using any conventional means, to center support 110 along the longitudinal axis traversing the center of fish attraction panel 108*a*. Further, bottom edge of fish attraction panel 108*a* is secured using any conventional means to axle 106.

A plurality of fish attraction floats 108*b* are positioned vertically along an axis traversing the center of area defined by jaws 102 and 104 and perpendicular to axle 106. In one embodiment of the present invention, about three fish attraction floats 108b are positioned vertically on each side of center support 110 along the axis traversing the center of area defined by jaws 102 and 104. In some embodiments of the present invention, fish attraction floats 108b are formed by cylindrical tubing filled with air to provide buoyancy and capped at both ends to secure the air within the tubing. Air inside the cylindrical tubing of fish attraction floats 108b provides buoyancy to fish attraction floats 108b and maintains each of fish attraction floats 108b in a vertical position when submerged underwater. In one embodiment of the present invention, fish attraction floats 108b are formed by ⅜-inch polyvinylchloride (PVC) pipes. Height of each of fish attraction floats 108b is selected such that the tops of each of fish attraction floats 108b are enclosed within lionfish harvesting system 100 when jaws 102 and 104 are closed. Fish attraction floats 108b are secured to a center line 122 extending between the apexes 102e and 104e of jaws 102 and 104 and perpendicular to axle 106. Each end of center line 122 is secured to apexes 102e and 104e. Exemplary materials that can be used for center line 122 include ⅜-inch braided polypropylene rope, nylon rope, polyethylene rope, and the like.

Center support 110 is located vertically at the center of area defined by jaws 102 and 104. Center support 110 is formed by cylindrical tubing with bottom end secured to axle 106. In one embodiment of the present invention, center support 110 is formed by cylindrical PVC tubing having a diameter of about ¾ inch. Top end of center support 110 is notched to engage harness loop 112. In one embodiment of the present invention, harness loop 112 has a diameter of about 5 centimeters. Height of center support 110 is selected such that harness loop 112 is supported by center support 110 at a position above the top edge of fish attraction panel 108a. Harness loop 112 is secured to top end of center support 110 with a center support line (not shown) traversing the cylindrical tubing of center support 110 with one end secured to the bottom of harness loop 112 and the other end secured to axle 106. Exemplary materials that can be used for center support line include ⅜-inch braided polypropylene rope, nylon rope, polyethylene rope, and the like.

Lionfish harvesting system 100 further includes lift line 118 for hauling lionfish harvesting apparatus 100. In one embodiment of the present invention, lift line 118 is a combination of floating polypropylene and sinking nylon line, and surface float, depending on local fishing regulations. Harness 120a and 120b is bundled to form two-line harness 120ab with one end connected to float 116 and the other ends connected to apexes 102e and 104e of jaws 102 and 104. More particularly, harness 120a traverses through harness loop 112 to connect to apex 102e and harness 120b traverses through harness loop 112 in the opposite direction to connect to apex 104e such that pulling lift line 118 in upward direction causes harnesses 120a and 120b to pull jaws 102 and 104 inward to close harvesting apparatus 100. In one embodiment of the present invention, each of harness 120a and 120b has a length of about 1.75 meters. Float 116 is positioned above harness loop 112 to prevent lift line 118 and harness 120a and 120b from dropping down and entangling with FAD 108 and jaws 102 and 104.

Figure 6:
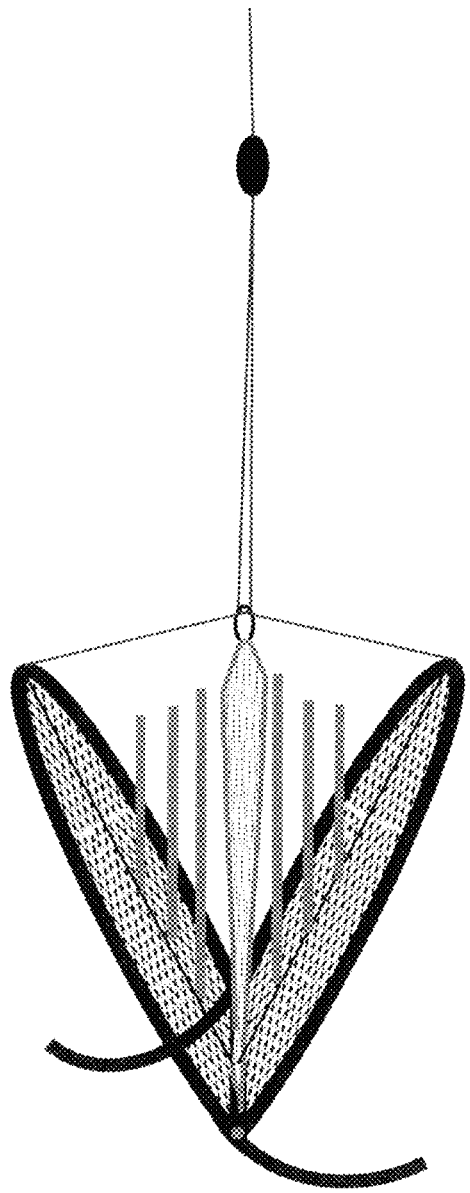
FIG. 6 illustrates a lionfish harvesting apparatus in accordance with an embodiment of the present invention in partially open position.
Figure 7:
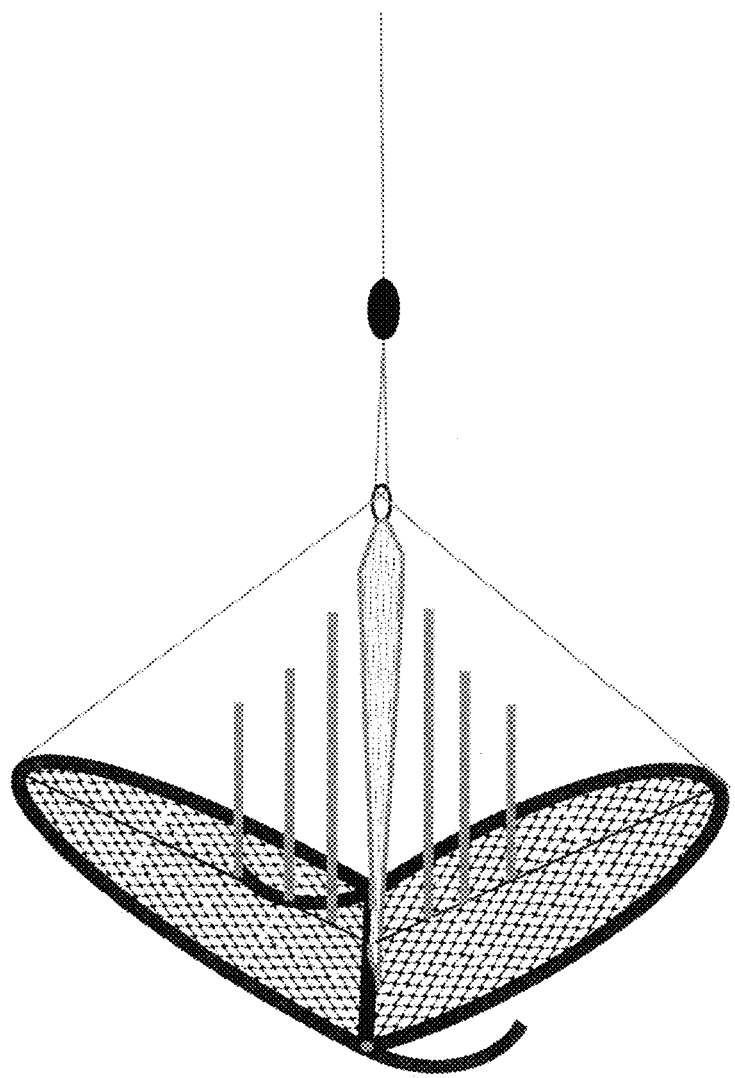
FIG. 7 illustrates a lionfish harvesting apparatus in accordance with an embodiment of the present invention in substantially open position.

During typical operation of lionfish harvesting apparatus 100, jaws 102 and 104 are pulled inward to closed position by harness 120a and 120b before allowing harvesting apparatus 100 to descend to the ocean floor. Closing of jaws 102 and 104 will cause FAD 108 and fish attraction floats 108b to collapse to a flat surface. Closed position of jaws 102 and 104 reduces drag while harvesting apparatus 100 descends vertically through the water. Deflectors 102c and 104c force jaws 102 and 104 to open outward when deflectors 102c and 104c contact the ocean floor, as shown in FIGS. 6 and 7. FAD 108 and fish attraction floats 108b open when jaws 102 and 104 open, and FAD 108 and fish attraction floats 108b remain in vertical position when jaws 102 and 104 lay on the bottom of the ocean floor in the open position. Lionfish harvesting apparatus 100 is retrieved by pulling lift line 118 upward from water surface. Pulling lift line 118 will cause harness 120a and 120b to fold jaws 102 and 104 inward and collapse FAD 108 and fish attraction floats 108b to a flat structure. Netting 114 will loosely cover jaws 102 and 104 and billow to surround the lionfish captured within enclosure formed by jaws 102 and 104 without overcrowding the captured lionfish. Pulling lift line 118 will further cause jaws 102 and 104 to remain in closed position.

Figure 8:
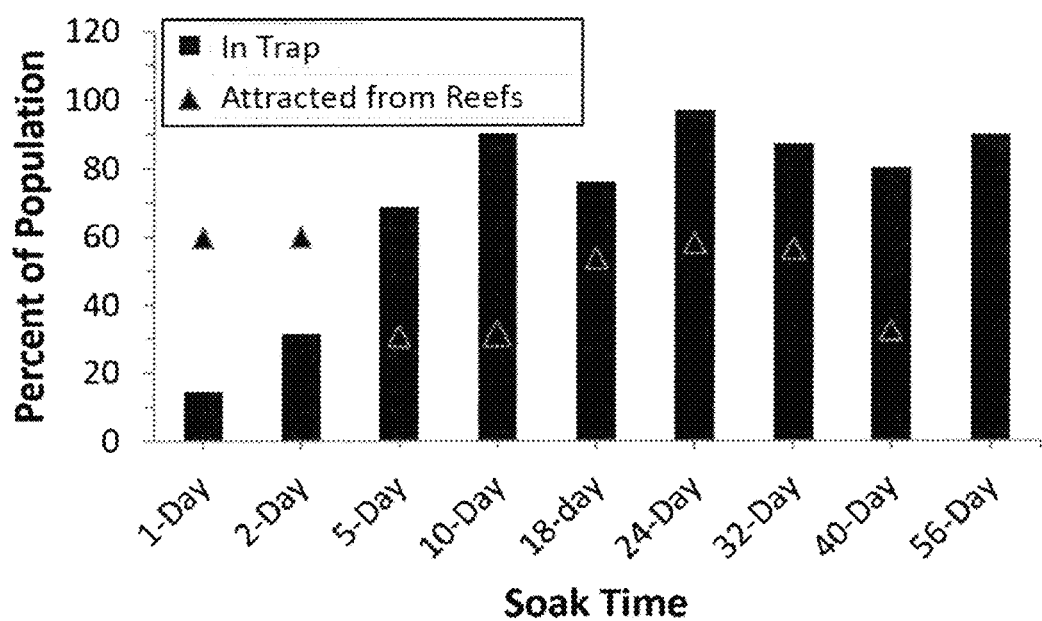
FIG. 8 shows a chart illustrating data obtained from an experimental study using embodiments in accordance with the present invention.

Apparatus in accordance with embodiments of the present invention has several advantages over previous lionfish harvesting apparatus. More particularly, geometry of the apparatus in accordance with embodiments of the present invention has several advantages over previous designs: The loose-fitting netting 114 of lionfish harvesting apparatus 100 reduces disturbance of lionfish during closure, increasing harvest levels. Deflectors 102c and 104c minimize disturbance of the seabed while ensuring opening of the apparatus upon contact with the bottom. The streamlined design of fish attraction panel 108a and fish attractions floats 108b reduces drag, increasing the descent tale and easing retrieval of the apparatus. The lack of bait, combined with the strong attraction of lionfish to vertical structure, reduces the likelihood of bycatch. The open, non-containment structure nearly eliminates the likelihood of ghost fishing by the apparatus in the event of loss. For example, in an experimental study conducted in an area of the Gulf of Mexico heavily infested with lionfish, three embodiments of non-containment, FAD-based curtain traps were tested using soak times between one and 56 days in 110 feet of water. The cumulative data revealed high levels of attraction for lionfish (FIG. 8) and field observations indicated only one case of potential bycatch (a single fish). It also suggested optimal soak times for that location being around one week, which is an acceptable interval for fishing using the traps. The study demonstrated the potential of non-containment, FAD-based curtain traps in capturing lionfish, and the performance benefits they offer compared to traditional baited containment traps, which tend to have high levels of bycatch. It is thought that lionfish harvesting apparatus of the present invention and many of its attendant advantages will be understood from the foregoing description and it will be apparent that various changes may be made in the form, construction arrangement of parts thereof without departing from the spirit and scope of the invention or sacrificing all of its material advantages, the form hereinbefore described being merely a preferred or exemplary embodiment thereof.

What is claimed is:

1. An apparatus for capturing lionfish, said apparatus comprising:
a first jaw comprising a first frame member, wherein first distal end of the first frame member comprises a first elbow connector, wherein the first elbow connector is located along an axis traversing a center of the first frame member;
a second jaw comprising a second frame member, wherein first distal end of the second frame member comprises a second elbow connector, wherein the second elbow connector is located along an axis traversing a center of the second frame member;

an axle having first and second distal end, wherein a length of the axle is selected such that the first and second distal ends of the axle extend outside an area defined by the first and second jaws;

a first hinge plate located at second distal end of the first frame member, wherein the first hinge plate comprises first and second hinge plate openings, wherein the first hinge plate opening is capable of receiving the first elbow connector, wherein the second hinge plate opening is capable of receiving the first distal end of the axle;

a second hinge plate located at second distal end of the second frame member, wherein the second hinge plate comprises third and fourth hinge plate openings, wherein the third hinge plate opening is capable of receiving the second elbow connector, wherein the fourth hinge plate opening is capable of receiving the second distal end of the axle;

a first deflector extending from second distal end of the first frame member, wherein the first deflector is capable of rotating the first jaw upon contact with a surface;

a second deflector extending from second distal end of the second frame member, wherein the second deflector is located diametrically opposite to the first deflector upon connecting the first elbow connector to the first hinge plate and the second elbow connector to the second hinge plate, wherein the second deflector is capable of rotating the second jaw upon contact with the surface;

a fish attraction device for attracting lionfish positioned vertically at a center of the area defined by the first and second jaws, wherein the fish attraction device comprises a fish attraction panel and a plurality of fish attraction floats, wherein the fish attraction panel and the plurality of fish attraction floats form a three-dimensional vertical structure capable of attracting lionfish, wherein the fish attraction panel is a flat rectangular panel comprising a patterned lattice;

a netting secured to the first and second jaw, wherein the netting is capable of securing a plurality of captured lionfish upon closing the first and second jaws, wherein the netting is capable of billowing upon closing the first and second jaws;

a harness comprising first and second harness lines for opening and closing the first and second jaws, wherein first ends of the first and second harness lines are connected to a float, wherein second ends of the first and second harness lines traverse a harness loop in opposite directions to separate into the first harness line and the second harness line, wherein the second end of the first harness line is connected to an apex of the second frame member, and wherein the second end of the second harness line is connected to an apex of the first frame member; and a lift line connected to the float for hauling the apparatus for capturing lionfish into and from ocean water.

2. The apparatus of claim 1, wherein the first and second frame members are semi-circular.

3. The apparatus of claim 2, wherein the first hinge plate opening receiving the first elbow connector and the third hinge plate opening receiving the second elbow connector connect the first and second frame members to form a circular ring.

4. The apparatus of claim 3, wherein the diameter of the circular ring formed by the first and second frame members is 2 meters.

5. The apparatus of claim 1, wherein the first and second frame members are semi-octagonal.

6. The apparatus of claim 5, wherein the first hinge plate opening receiving the first elbow connector and the third hinge plate opening receiving the second elbow connector connect the first and second frame members to form an octagonal ring.

7. The apparatus of claim 1, wherein the first and second deflectors are bent to form curved skids, wherein the curved skids are bent along an arc with distal ends of the curved skids perpendicular to a plane of the first and second jaws.

8. The apparatus of claim 7, wherein the distal ends of the curved skids extend from the plane of the first and second jaws by 46 centimeters.

9. The apparatus of claim 1, wherein the length of the axle is about 2.15 meters.

10. An apparatus for capturing lionfish, said apparatus comprising:

a first jaw comprising a first frame member, wherein first distal end of the first frame member comprises a first elbow connector, wherein the first elbow connector is located along an axis traversing a center of the first frame member;

a second jaw comprising a second frame member, wherein first distal end of the second frame member comprises a second elbow connector, wherein the second elbow connector is located along an axis traversing a center of the second frame member;

an axle having first and second distal end, wherein a length of the axle is selected such that the first and second distal ends of the axle extend outside an area defined by the first and second jaws;

a first hinge plate located at second distal end of the first frame member, wherein the first hinge plate comprises first and second hinge plate openings, wherein the first hinge plate opening is capable of receiving the first elbow connector, wherein the second hinge plate opening is capable of receiving the first distal end of the axle;

a second hinge plate located at second distal end of the second frame member, wherein the second hinge plate comprises third and fourth hinge plate openings, wherein the third hinge plate opening is capable of receiving the second elbow connector, wherein the fourth hinge plate opening is capable of receiving the second distal end of the axle;

a first deflector extending from second distal end of the first frame member, wherein the first deflector is capable of rotating the first jaw upon contact with a surface;

a second deflector extending from second distal end of the second frame member, wherein the second deflector is located diametrically opposite to the first deflector upon connecting the first elbow connector to the first hinge plate and the second elbow connector to the second hinge plate, wherein the second deflector is capable of rotating the second jaw upon contact with the surface;

a fish attraction device for attracting lionfish positioned vertically at a center of the area defined by the first and second jaws, wherein the fish attraction device comprises a fish attraction panel and a plurality of fish attraction floats, wherein each of the plurality of the fish attraction floats is a cylindrical tubing capped at both ends, and wherein the cylindrical tubing is filled with air to provide buoyancy;

a netting secured to the first and second jaw, wherein the netting is capable of securing a plurality of captured lionfish upon closing the first and second jaws, wherein the netting is capable of billowing upon closing the first and second jaws;
a harness comprising first and second harness lines for opening and closing the first and second jaws, wherein first ends of the first and second harness lines are connected to a float, wherein second ends of the first and second harness lines traverse a harness loop in opposite directions to separate into the first harness line and the second harness line, wherein the second end of the first harness line is connected to an apex of the second frame member, and wherein the second end of the second harness line is connected to an apex of the first frame member, and
a lift line connected to the float for hauling apparatus for capturing lionfish into and from ocean water.

11. The apparatus of claim 1, further comprising a center support located vertically at the center of the area defined by the first and second jaws, wherein the center support is a cylindrical tubing, wherein top end of the center support secures the harness loop, wherein bottom end of the center support is secured to the axle, and wherein the center support is capable of supporting the fish attraction panel in a vertical position when secured to the axle.

* * * * *